(12) United States Patent
Tannenbaum et al.

(10) Patent No.: US 9,268,528 B2
(45) Date of Patent: Feb. 23, 2016

(54) SYSTEM AND METHOD FOR DYNAMICALLY REDUCING POWER CONSUMPTION OF FLOATING-POINT LOGIC

(71) Applicant: NVIDIA Corporation, Santa Clara, CA (US)

(72) Inventors: David C. Tannenbaum, Austin, TX (US); Srinivasan Iyer, Austin, TX (US)

(73) Assignee: NVIDIA Corporation, Santa Clara, CA (US)

( * ) Notice: Subject to any disclaimer, the term of this patent is extended or adjusted under 35 U.S.C. 154(b) by 263 days.

(21) Appl. No.: 13/901,492

(22) Filed: May 23, 2013

(65) Prior Publication Data

US 2014/0351308 A1 Nov. 27, 2014

(51) Int. Cl.
 *G06F 7/483* (2006.01)
 *G06F 7/523* (2006.01)
(52) U.S. Cl.
 CPC ............... *G06F 7/483* (2013.01); *G06F 7/523* (2013.01)

(58) Field of Classification Search
 CPC .......................................... G06F 7/483–7/4876
 USPC .......................................................... 708/495
 See application file for complete search history.

(56) References Cited

U.S. PATENT DOCUMENTS

| 5,787,029 A * | 7/1998 | de Angel ........................ 708/628 |
| 7,546,331 B2 * | 6/2009 | Islam ............................. 708/627 |
| 2007/0203967 A1 * | 8/2007 | Dockser ......................... 708/495 |

OTHER PUBLICATIONS

U.S. Appl. No. 13/683,362, filed Nov. 21, 2012.

* cited by examiner

*Primary Examiner* — Chuong D Ngo
(74) *Attorney, Agent, or Firm* — Zilka-Kotab, PC (57) ABSTRACT

A system and method are provided for dynamically reducing power consumption of floating-point logic. A disable control signal that is based on a characteristic of a floating-point format input operand is received and a portion of a logic circuit is disabled based on the disable control signal. The logic circuit processes the floating-point format input operand to generate an output.

20 Claims, 8 Drawing Sheets

SYSTEM AND METHOD FOR DYNAMICALLY REDUCING POWER CONSUMPTION OF FLOATING-POINT LOGIC

FIELD OF THE INVENTION

The present invention relates to logic circuitry, and more specifically to power consumption reduction.

BACKGROUND

Processing units such as central processing units (CPUs) and graphics processing units (GPUs) are designed to perform arithmetic operations that conform to a specified numeric representation. One common numeric representation is a floating-point number, which typically includes a mantissa field, an exponent field, and a sign field. For example, a floating-point number format specified by the institute of electrical and electronics engineers (IEEE) is thirty-two bits in size and includes twenty-three mantissa bits, eight exponent bits, and one sign bit. Other standard floating-point numbers are defined that are up to one-hundred and twenty-eight bits in size. Floating-point arithmetic circuits configured to implement arithmetic operations on floating-point numbers must properly process one or more input floating-point numbers and generate an arithmetically correct floating-point result.

Conventional IEEE format floating-point multiply/add units include a large multiplier followed by a wide adder which receives a product generated by the multiplier and a shifted version of an addend that are combined to produce the value of a*b+c that is then normalized. This value is then inspected and renormalized to return a value conforming to the IEEE floating-point format specification. To conform to the IEEE standard, an implementation of a floating-point multiply/add unit maintains complete internal precision between the multiplier and multiplicand (a and b) used to generate the product and the c addend through the computation to the output. Maintaining the internal precision necessitates a large logic circuit that expends both static and dynamic power.

Thus, there is a need for reducing the amount of power consumed by floating-point arithmetic circuits and/or addressing other issues associated with the prior art.

SUMMARY

A system and method are provided for dynamically reducing power consumption of floating-point logic. A disable control signal that is based on a characteristic of a floating-point format input operand is received and a portion of a logic circuit is disabled based on the disable control signal. The logic circuit processes the floating-point format input operand to generate an output.

DETAILED DESCRIPTION

In accordance with one possible embodiment, portions of a logic circuit are disabled to reduce power consumption. The average power consumed by a floating-point processing unit may be reduced while explicitly maintaining IEEE conformance with respect to rounding and internal precision by dynamically disabling portions of the logic circuitry within the floating-point processing unit.

Figure 1:
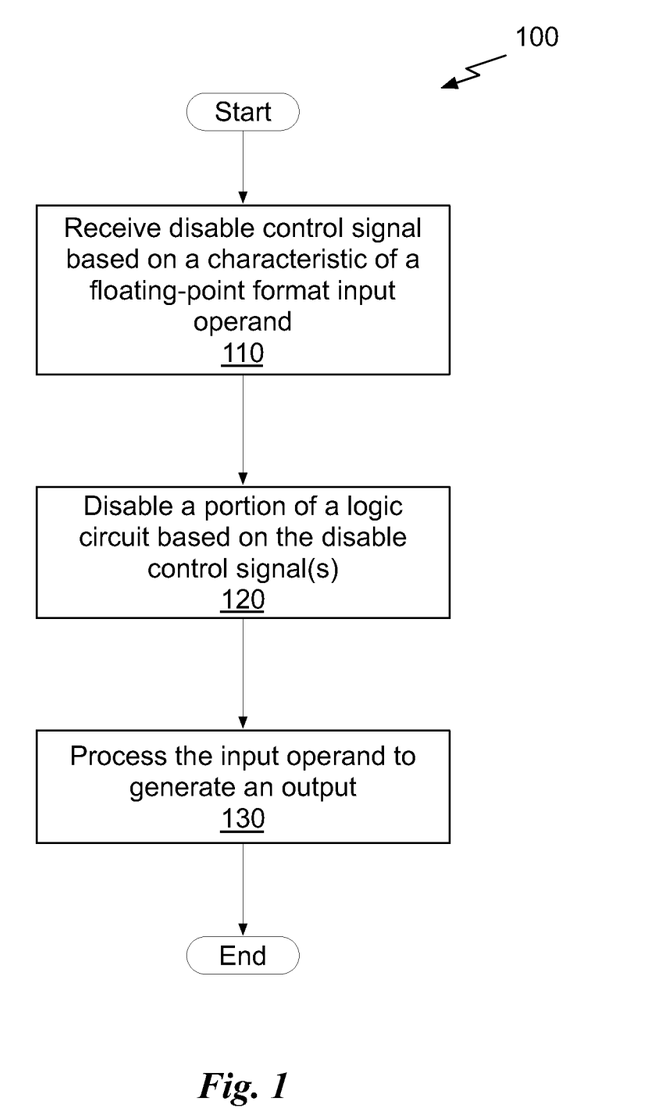
FIG. 1 illustrates a flowchart of a method for dynamically reducing power consumption of logic circuitry, in accordance with one embodiment.

FIG. 1 illustrates a flowchart of a method 100 for dynamically reducing power consumption of floating-point logic, in accordance with one embodiment. At operation 110, a disable control signal that is based on a characteristic of a floating-point format input operand is received. In the context of the present description, the floating-point format input operand may be represented in a floating-point format, such as an IEEE standard floating point format that is 16, 32, 64, 128, or more bits. Characteristics of the floating-point input operand may include a number of trailing zeros in a significand (i.e., mantissa) represented by the floating-point format operand, a bit accuracy specified for a computation performed by the logic circuit, a number of bits needed to represent a constant value, or a permitted error associated with an output.

At operation 120, a portion of a logic circuit is disabled based on the disable control signal. In some possible embodiments, the logic circuit may be configured to perform arithmetic floating-point operations, such as addition, multiplication, subtraction, and the like. In the context of the present description, one or more disable control signals may be provided by an upstream processing unit and/or one or more disable control signals may be generated based on the input operands that are provided to a floating-point processing unit that includes the logic circuit. At operation 130, the floating-point operand is processed by the logic circuit to generate the output.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

The disable control signals may be configured to disable portions of the logic circuit when the values of the input operands are such that some portion of a floating-point processing unit configured to perform arithmetic floating-point operations can be gated or otherwise "turned-off". For example, when there are one or more trailing zeros in a significand of a floating-point format operand, the bits of a register that stores the significand may be disabled when the significand is multiplied to produce a product. The adder circuits that generate sum and carry values are also disabled based on the number of trailing zeros, and propagation of a carry signal that generates the output is disabled. When an operand is represented in a floating-point format, one or more of the trailing bits of the significand may be zero because the significand is produced by aligning the value so that a one is present in the most significant bit (MSB). In contrast, when an operand is represented in a fixed point format, one or more of the leading bits of the value may be zero because the fixed point format is not aligned to ensure that a one is present in the MSB.

Figure 2A:
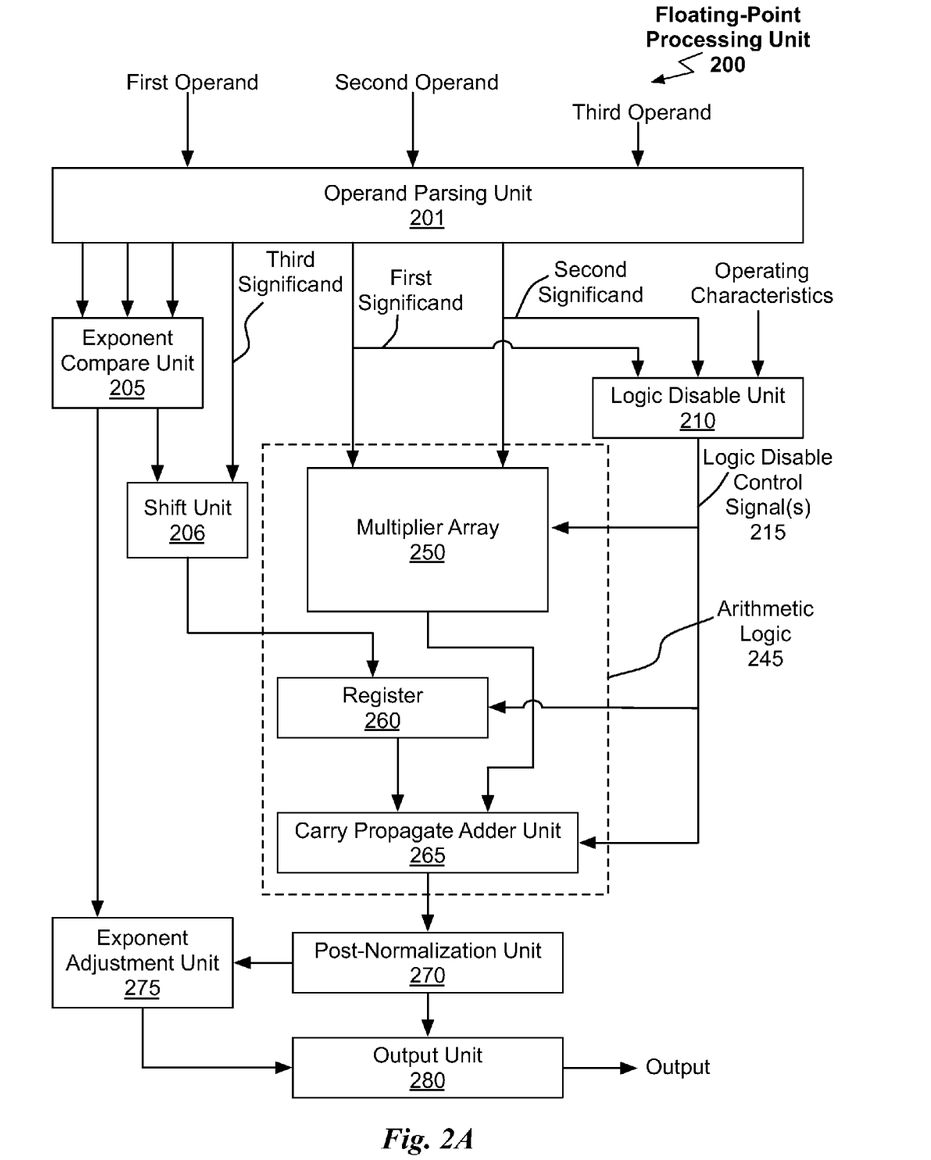
FIG. 2A illustrates a block diagram of a floating-point arithmetic computation unit, in accordance with one embodiment.

FIG. 2A illustrates floating-point processing unit 200, in accordance with one embodiment. The floating-point processing unit 200 receives a first, second, and third operand and produces an output. In the context of the present embodiment, the operands and the output are represented in a floating-point format. As shown in FIG. 2A, the floating-point processing unit 200 is configured to compute the output as a sum of the third operand and the product of the first and second operands. In other embodiments, the floating-point processing unit 200 may be configured to perform other arithmetic operations, such as, addition, subtraction, division, reciprocal, and the like, without limitation.

An operand parsing unit 201 is configured to parse each operand into an exponent portion and a significand portion according to the particular floating-point representation. The exponent portions are output to an exponent compare unit 205 that generates a difference between the third operand exponent and the sum of the first and second operand exponents. The difference is a shift amount that is provided to a shift unit 206. The shift unit 206 shifts the third significand by the shift amount and outputs an aligned third significand to a register 260. The register 260 stores the aligned third significand and provides the aligned third significand to a carry-propagate adder unit 265.

Figure 3A:
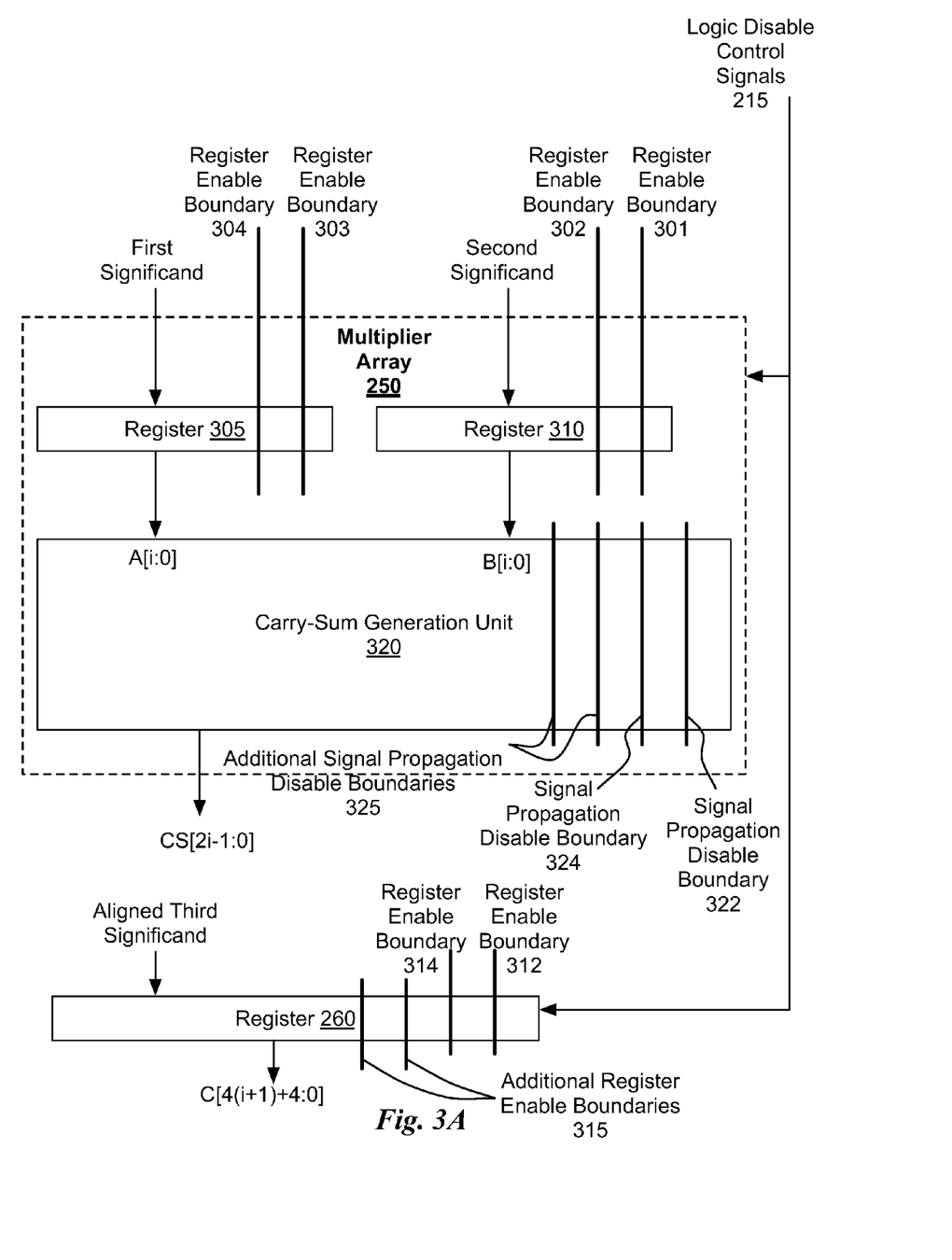
FIG. 3A illustrates a block diagram of the multiplier array shown in FIG. 2A, in accordance with one embodiment.

The register 260 may be configured to receive a logic disable control signal 215 that enables/disables one or more bits of the register 260, as described in detail in conjunction with FIG. 3A. Disabling one or more bits of the register 260 causes corresponding flip-flops to hold a previous value rather than transfer bits of the aligned third significand to the carry propagate adder unit 265. Therefore, power consumption is reduced because the outputs of the flip-flops are not switching and the flip-flop circuits are idle.

The first and second significands are output by the operand parsing unit 201 to arithmetic logic 245 and a logic disable unit 210. The logic disable unit 210 also receives operating characteristics. In the context of the present embodiment, the operating characteristics may be based on an operating mode or may encode characteristics that are specific to the first and/or second significand. For example, an operating mode may configure the floating-point processing unit 200 to compute the output at a particular bit accuracy or may specify a permitted error that corresponds to a particular bit accuracy. Therefore, a portion of the least significant bits of the first significand and/or second significand may not be used to compute intermediate values within the arithmetic logic 245. Characteristics that may be encoded by the operating characteristics include indicating a number of bits of the first significand and/or second significand that represent a constant value, an indication of the number of trailing zeros in the first significand and/or second significand, or an indication that the first significand and/or second significand represent a particular value, such as zero, one, +/− infinity, or NaN (not-a-number). The operating characteristics may be provided by configuration registers related to operating mode settings and/or upstream logic circuitry.

The logic disable unit 210 is configured to generate logic disable control signal(s) 215 based on one or more of the first significand, the second significand, and the operating characteristics. Details of the logic disable unit 210 are provided in conjunction with FIG. 2B. The logic disable control signal(s) 215 may be configured to enable/disable one or more bits of registers, such as the register 260, as described in further detail in conjunction with FIG. 3A. The logic disable control signal(s) 215 may also be configured to disable/enable propagation of a carry signal, as described in further detail in conjunction with FIG. 3B.

The arithmetic logic 245 includes a multiplier array 250, the register 260, and a carry propagate adder unit 265. In one embodiment, the multiplier array 250 is implemented as a carry-save array that generates low bits of a product of the first and second significand and carry and sum bits corresponding to higher bits of the product. The carry propagate adder unit 265 combines the output of the register 260 with the low bits of the product and the carry and sum bits to produce a result, as described in further detail in conjunction with FIG. 3B. The result is then processed by a post-normalization unit 270 to produce a significand of the output that is represented in a standard floating-point format.

For example, the post-normalization unit 270 may be configured to identify a leading one in the result and provide a shifted significand without the leading one to an output unit 280. The number of bits of the result to the left of the leading one may be provided to an exponent adjustment unit 275. The exponent compare unit 205 provides a sum of the first and second operand exponents or the third operand's exponent, depending on the relative magnitude of the exponents, to an exponent adjustment unit 275. The exponent adjustment unit 275 computes and provides the exponent of the output to the output unit 280. The output unit 280 may be a register that receives the exponent and shifted significand and stores the output in the floating-point format.

Figure 2B:
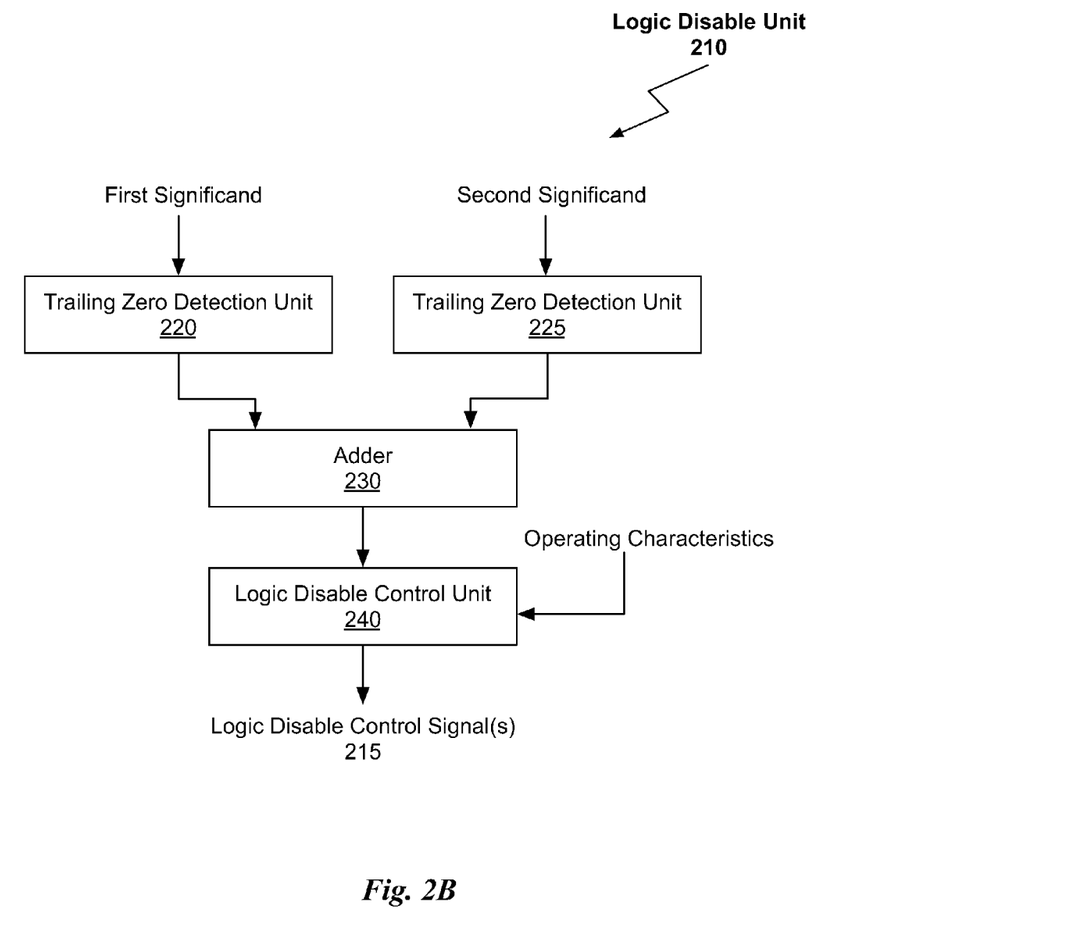
FIG. 2B illustrates a logic disable unit shown in FIG. 2A, in accordance with one embodiment.

FIG. 2B illustrates the logic disable unit 210 of FIG. 2A, in accordance with one embodiment. When the operating characteristics do not indicate a number of trailing zeros for the first and/or the second significand, the logic disable unit 210 may compute the number of trailing zeros. A trailing zero detection unit 220 is configured to compute the number of trailing zeros in the first significand and a trailing zero detection unit 225 is configured to compute the number of trailing zeros in the second significand. An adder 230 sums the number of trailing zeros received from the trailing zero detection unit 220 and the trailing zero detection unit 225 to produce a trailing zero sum. The trailing zero sum is provided to a logic disable control unit 240 along with the operating characteristics.

The logic disable control unit 240 generates logic disable control signal(s) 215 based on the trailing zero sum and/or the operating characteristics. For example, the operating characteristics may indicate that the second significand represents a 4-bit constant value (e.g., 0.5, 2.0, 4.0, 0.25, etc.) that has been zero extended as needed to conform to the floating-point format. The logic disable control unit 240 may generate a logic disable control signal 215 that disables the low 20 bits of a register (assuming 24 bits encode the significand of a floating-point format operand) that provides the second significand to the multiplier array 250 and disables propagation of a carry signal from the low 20 bits within the carry propagate adder unit 265. The low 20 bits output by the register that provides the second significand to the multiplier array 250 will not be accurate when the flip-flops corresponding to the low 20 bits are disabled, therefore it is necessary to ensure that the carry signal is not propagated. Adder cells within the multiplier array 250 and the carry propagate adder unit 265 that correspond to the low 20 bits may be disabled to reduce power consumption. The logic disable control unit 240 may generate a logic disable control signal 215 that disables the low 20 bits of the register 260 that provides the aligned third significand to the carry propagate adder unit 265.

When the trailing zero sum indicates that the product of the first and second significands have 10 trailing zeros, the logic disable control unit 240 may generate a logic disable control signal 215 that disables adder cells within the multiplier array 250 and the carry propagate adder unit 265 that correspond to the low 10 bits. The logic disable control unit 240 may generate a logic disable control signal 215 that disables the low 10 bits of the register 260 that provides the aligned third significand to the carry propagate adder unit 265.

When the operating characteristics indicate that the first significand has 4 trailing zeros, the logic disable control unit 240 may generate a logic disable control signal 215 that disables the low 4 bits of a register that provides the second significand to the multiplier array 250 and disables propagation of a carry signal from the low 4 bits within the carry propagate adder unit 265. The logic disable control unit 240 may generate a logic disable control signal 215 that disables the low 4 bits of the register 260 that provides the aligned third significand to the carry propagate adder unit 265.

In the previous examples, the power reduction resulting from dynamically disabling portions of the logic circuitry within the floating-point processing unit 200 is opportunistic and does not reduce the accuracy of the output. The computations performed by the floating-point processing unit 200 conform to the IEEE specified rounding and internal precision. When the operating characteristics indicate that the output accuracy can be reduced to a specific number of bits or a permitted error is specified, portions of the logic circuitry may be dynamically disabled that may cause the accuracy of the output to be reduced. In one embodiment, the permitted error may correspond to a Newton-Raphson known error bound for the computation performed by the floating-point processing unit 200.

For example, when the permitted error corresponds to 16 bits of accuracy, the logic disable control unit 240 may generate logic disable control signals 215 that disable the low 8 bits of the registers (assuming 24 bits encode the significand of a floating-point format operand) that provides the first and second significands to the multiplier array 250 and disable propagation of a carry signal from the low 8 bits within the carry propagate adder unit 265. Adder cells within the multiplier array 250 and the carry propagate adder unit 265 that correspond to the low 8 bits may be disabled to reduce power consumption. The logic disable control unit 240 may also generate a logic disable control signal 215 that disables the low 8 bits of the register 260 that provides the aligned third significand to the carry propagate adder unit 265.

The logic disable control unit 240 may be configured to generate the logic disable control signal(s) 215 based on a combination of the operating characteristics and the trailing zero sum to disable a greater portion of the logic circuitry for a particular set of input operands. The operating conditions may be unchanged for several sets of input operands while the trailing zero sum is computed for each set of input operands.

FIG. 3A illustrates a block diagram of the multiplier array 250 and the register 260 shown in FIG. 2A, in accordance with one embodiment. The logic disable control signals 215 are provided to the multiplier array 250 and the register 260. A register 305 is configured to store bits of the first significand and a register 310 is configured to store bits of the second significand. Flip-flops within the registers 305 and 310 may be selectively enabled and disabled by the logic disable control signals 215 to store only a portion of the first and/or second significand. The logic disable control signals 215 correspond to register enable boundaries 301, 302, 303, and 304 within the registers 305 and 310. The register enable boundary 301 may be positioned to disable one least-significant bit (LSB) of the register 310 or may be position to disable multiple LSBs. The register enable boundary 302 may be positioned to disable one additional LSB of the register 310 or may disable multiple additional LSBs.

In one embodiment, register enable boundaries 301, 302, 303, and 304 are configured to disable bits of the registers 305 and 310 at 4 bit increments. In another embodiment, register enable boundaries 301 and 303 are configured to disable 8 LSBs of the registers 305 and 310 and register enable boundaries 302 and 304 are configured to disable the next 4 LSBs of the registers 305 and 310. In yet another embodiment, register enable boundaries 301 and 303 are configured to disable 3 LSBs of the registers 305 and 310 and register enable boundaries 302 and 304 are configured to disable the next 7 LSBs of the registers 305 and 310.

As previously explained, when portions of the circuitry within the registers 305 and/or 310 are disabled, a corresponding portion of the logic circuitry in a carry-sum generation unit 320 is also disabled so that the low bits of the first and second significant that are disabled and do not reflect the correct values for the first and second signficand do not contribute to the carry and sum values that are output by the carry-sum generation unit 320. The carry-sum generation unit 320 receives two inputs A[i:0] and B[i:0], where i is the number of bits in the significand excluding the implied leading one, so that when the significand is 23 bits, i=23, and A and B each include the implied leading one and are each 24 bits. The carry-sum generation unit 320 may implement well-known techniques in the art to generate the carry-sum bits CS[2i−1:0]. For example, the carry-sum generation unit 320 may include a carry-save array and/or a Wallace tree.

The signal propagation disable boundaries 322 and 324 correspond to the combination of the register enable boundaries 301, 302, 303, and 304. For example, the signal propagation disable boundary 322 may be activated by a logic disable control signal 215 whenever at least one of the register enable boundaries 301, 302, 303, and 304 is activated. The signal propagation disable boundary 324 may be activated by a logic disable control signal 215 whenever both of the register enable boundaries 301 and 302 are activated. In one embodiment, a boundary corresponding to lower LSBs is always activated when a boundary corresponding to higher LSBs is activated by the logic disable control signals 215. In one embodiment, additional signal propagation disable boundaries 325 corresponding to the register enable boundaries 302 and 304 may be implemented to disable additional logic circuitry within the carry-sum generation unit 320.

Similar to the control of registers 305 and 310, the logic disable control signals 215 are configured to disable and enable portions of the logic circuitry within the register 260. The register enable boundaries 312, 314, and additional register enable boundaries 315 correspond to the combination of the register enable boundaries 301, 302, 303, and 304. For example, the register enable boundary 312 may be activated by a logic disable control signal 215 whenever at least one of the register enable boundaries 301, 302, 303, and 304 is activated. The signal propagation disable boundary 314 may be activated by a logic disable control signal 215 whenever both of the register enable boundaries 301 and 302 are activated. Additional register enable boundaries 315 are also provided for the register 260. In one embodiment, further additional register enable boundaries are provided for one or more of registers 305, 310, and 260.

The register 260 stores the bits of the aligned third significand for bits that are enabled according to the logic disable control signals 215 so that all of the bits of the third significand may not be stored in the register 260. The output of the register 260, shown as C[4(i+1)+4:0] is provided as an input to the carry-propagate adder unit 265 along with the outputs of the carry-sum generation unit 320 (i.e., CS[2i−1:0]).

Persons skilled in the art will understand that fewer or additional pipeline registers may be implemented within the floating-point processing unit 200. One or more bits of any additional pipeline registers may be dynamically enabled or disabled by the logic disable control signals 215.

Figure 3B:
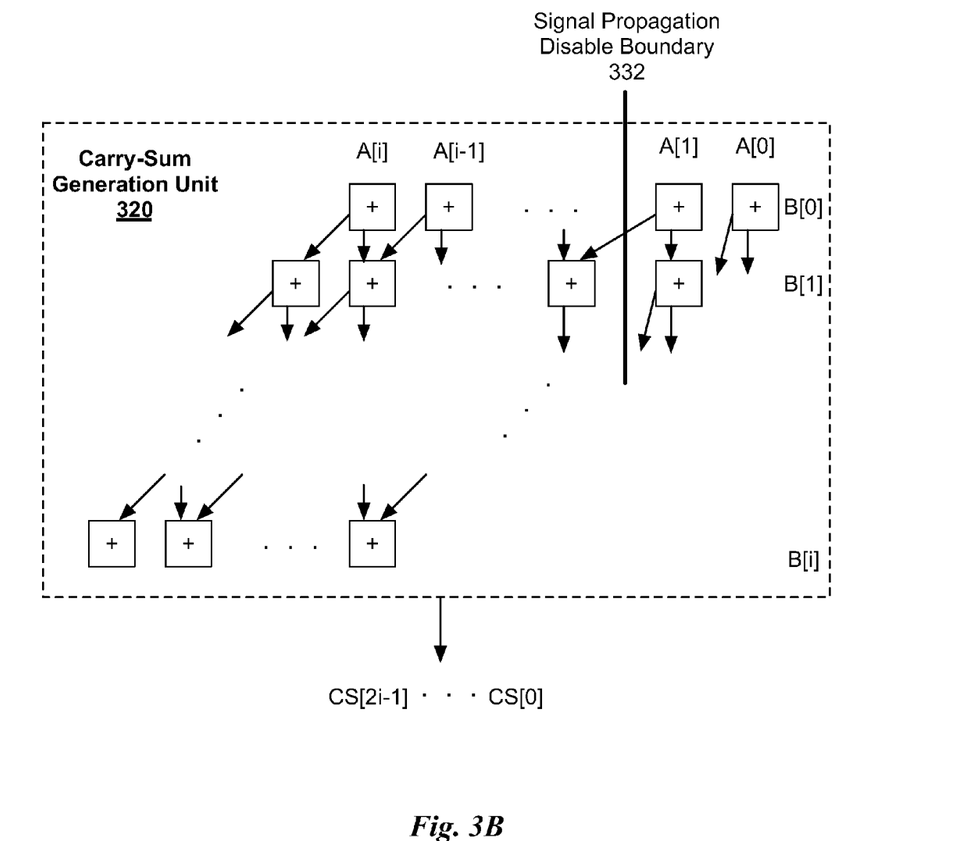
FIG. 3B illustrates a block diagram of the carry-sum generation unit shown in FIG. 3A, in accordance with one embodiment.

FIG. 3B illustrates a block diagram of the carry-sum generation unit 320 shown in FIG. 3A, in accordance with one embodiment. In one embodiment, the carry-sum generation unit 320 is replaced with a Booth encoding structure that generates a set of partial products that are passed through a reducing tree to produce the carry and sum values.

As shown in FIG. 3B, the carry-sum generation unit 320 includes an array of adder circuits configured to receive two one-bit inputs and generate a sum and a carry output. One or more of the LSBs of either or both inputs may be provided by disabled portions of logic circuitry so that the bits remain unchanged from a previous clock cycle. The carry and sum outputs produced from disabled circuitry should not contribute to the outputs generated by the carry-sum generation unit 320 and the carry propagate adder unit 265. Therefore, portions of the circuitry within the carry-sum generation unit 320 are disabled. For example, logic circuitry to the right of the signal propagation disable boundary 332 may be disabled or decoupled from the logic circuitry to the left of the signal propagation disable boundary 332 when the sum of the trailing zeros of the first and second significands (output by the adder 230) is greater than or equal to 2. Additional signal propagation disable boundaries may be provided within the carry-sum generation unit 320 that are also controlled by the logic disable control signals 215.

Figure 3C:
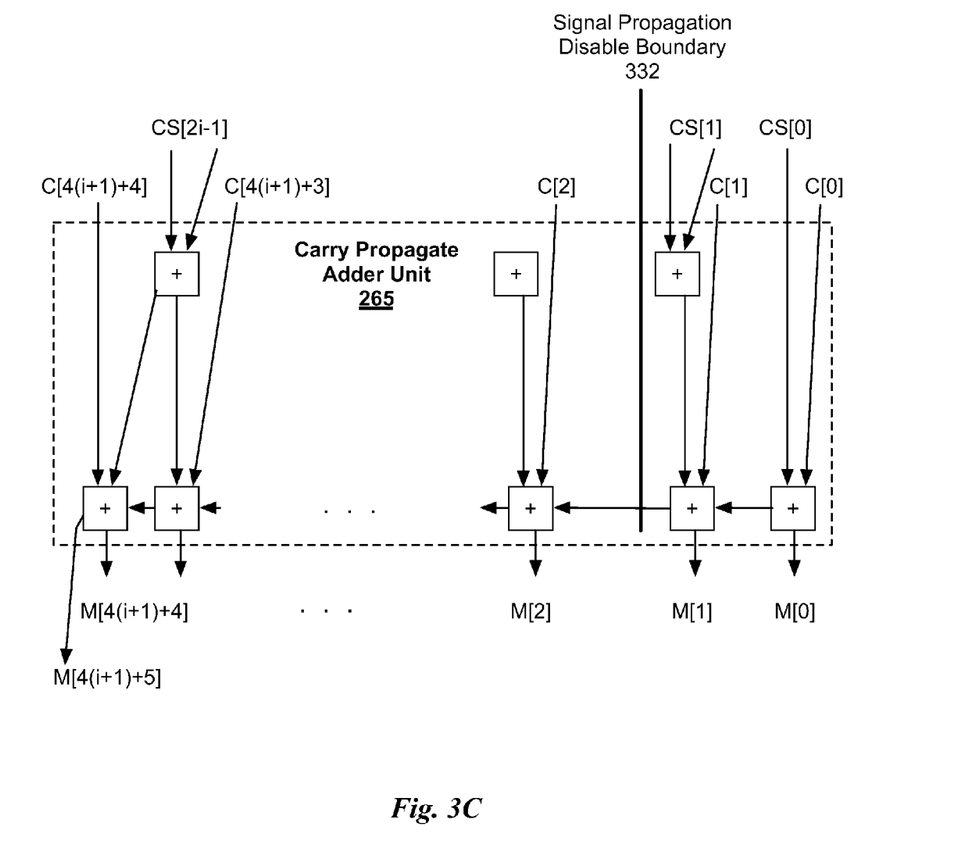
FIG. 3C illustrates a block diagram of the carry propagate adder unit shown in FIG. 2A, in accordance with one embodiment.

FIG. 3C illustrates a block diagram of the carry propagate adder unit 265 shown in FIG. 2A, in accordance with one embodiment. The carry and sum outputs produced from disabled circuitry in the carry-sum generation unit 320 should not contribute to the outputs generated by the carry propagate adder unit 265. Therefore, portions of the circuitry within the carry propagate adder unit 265 are disabled. For example, logic circuitry to the right of the signal propagation disable boundary 332 may be disabled or decoupled from the logic circuitry to the left of the signal propagation disable boundary 332. Additional signal propagation disable boundaries may be provided within the carry propagate adder unit 265 that are also controlled by the logic disable control signals 215.

In one embodiment, the logic circuitry is disabled or decoupled by multiplexing a zero to replace a signal provided by disabled logic circuitry. For example, a zero may be multiplexed to provide a carry input to the adder circuit within the carry propagate adder unit 265 that generates M[2], where M is a multiply-add result. The multiply-add result M[4(i+1)+5:0] is the sum of the aligned third significand and the product of the first and second significands.

Figure 4:
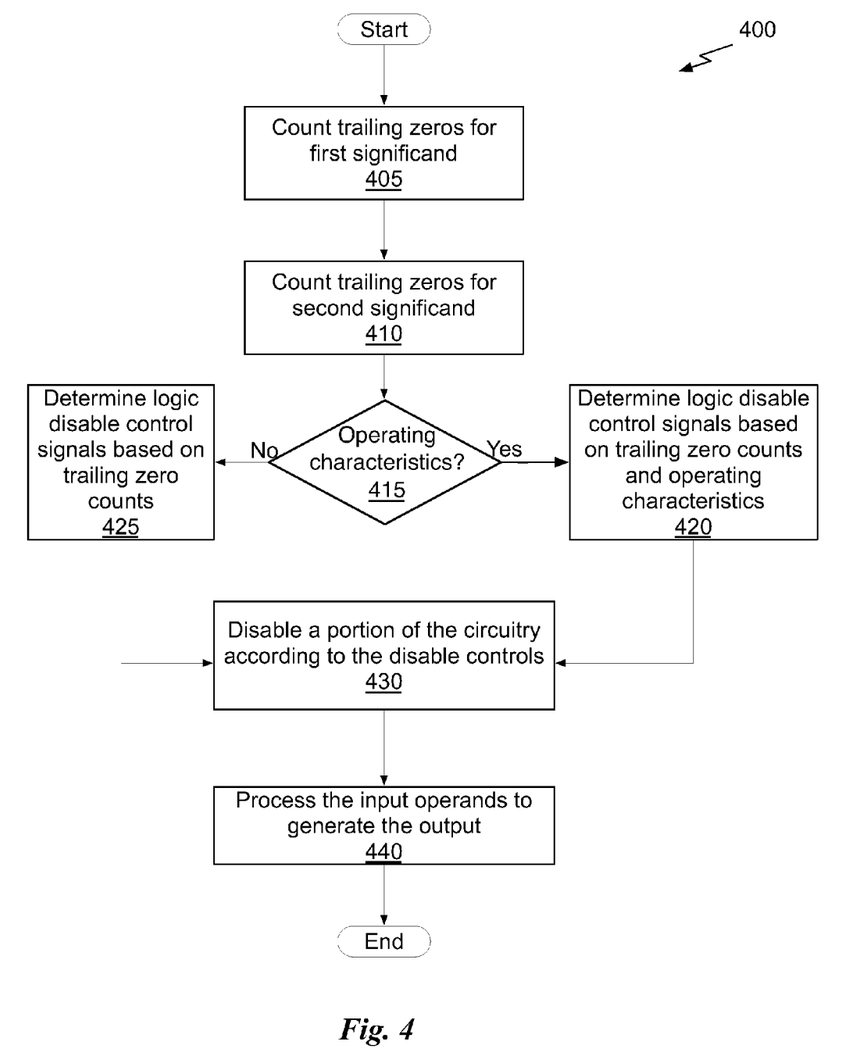
FIG. 4 illustrates another flowchart of a method for dynamically reducing power consumption of logic circuitry, in accordance with one embodiment.

FIG. 4 illustrates another flowchart of a method 400 for dynamically reducing power consumption of logic circuitry, in accordance with one embodiment. At operation 405, the logic disable unit 210 determines a number of trailing zeros for the first significand. At operation 410, the logic disable unit 210 determines a number of trailing zeros for the second significand. At operation 415, the logic disable unit 210 determines if operating characteristics are provided, and, if not, at operation 425, the logic disable unit 210 determines the logic disable control signal(s) 215 based on the trailing zero counts for the first and/or the second signficands. Otherwise, at operation 420, the logic disable unit 210 determines the logic disable control signal(s) 215 based on a combination of the operating characteristics and the trailing zero counts for the first and/or the second signficands.

At operation 430, a portion of the circuitry within the multiplier array 250, register 260, and/or carry propagate adder unit 265 may be dynamically disabled based on the disable control signal(s) 215. As shown in FIG. 2A, the floating-point processing unit 200 is configured to perform a floating-point multiply-add arithmetic operation. At operation 440, the floating-point format input operands are processed by the floating-point processing unit 200 to generate the output.

In other embodiments, a floating point processing unit may be configured to perform other floating-point arithmetic operations while also dynamically disabling a portion of the logic circuitry. For example, when floating-point multiplication is performed for two input operands, LSBs of registers storing the significands and corresponding circuitry within a carry-save array and propagation of a carry signal may be dynamically disabled. When floating-point addition is performed for two input operands, LSBs of registers storing the significands and propagation of a carry signal may be dynamically disabled.

Figure 5:
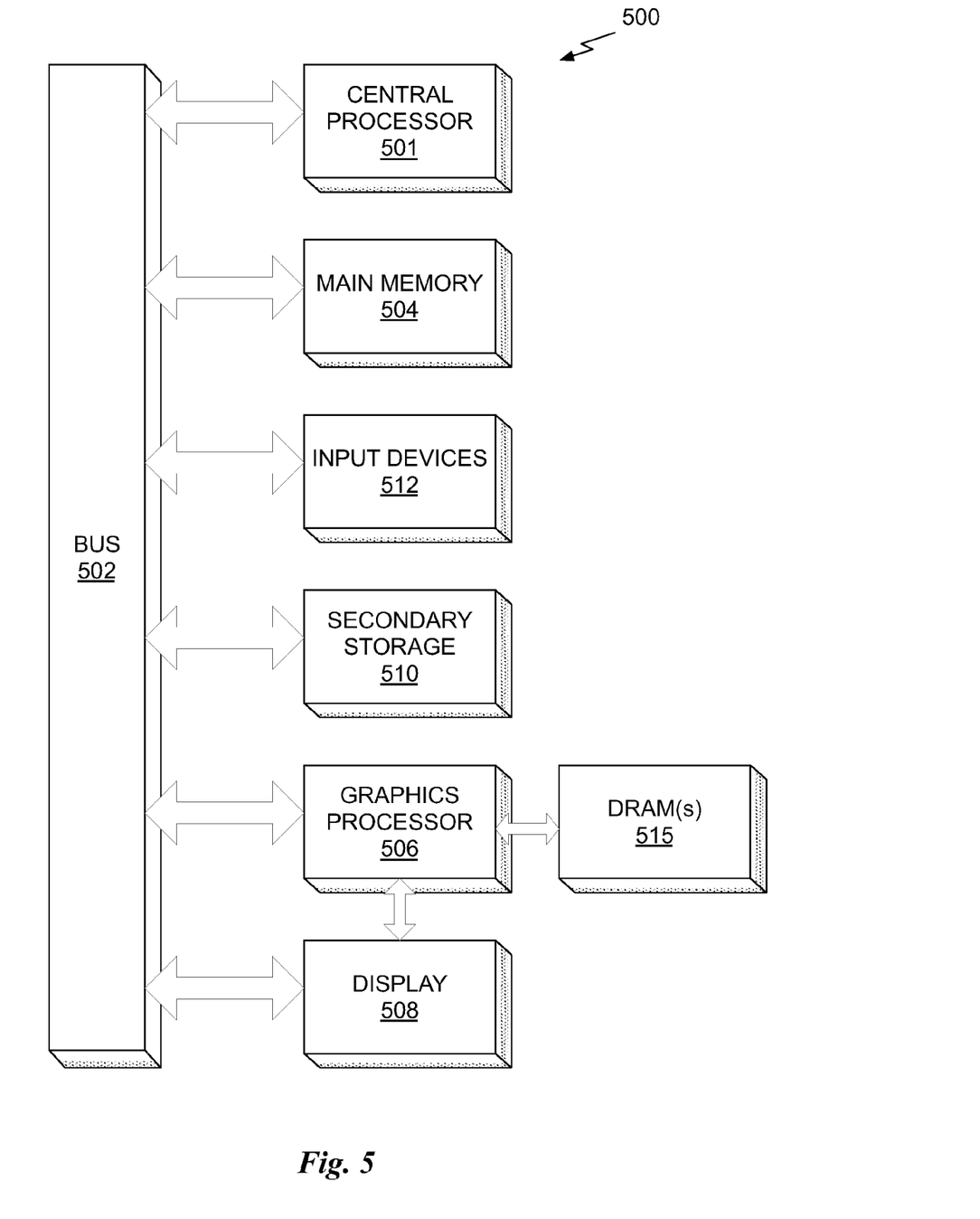
FIG. 5 illustrates an exemplary system in which the various architecture and/or functionality of the various previous embodiments may be implemented.

FIG. 5 illustrates an exemplary system 500 in which the various architecture and/or functionality of the various previous embodiments may be implemented. As shown, a system 500 is provided including at least one central processor 501 that is connected to a communication bus 502. The communication bus 502 may be implemented using any suitable protocol, such as PCI (Peripheral Component Interconnect), PCI-Express, AGP (Accelerated Graphics Port), HyperTransport, or any other bus or point-to-point communication protocol(s). The system 500 also includes a main memory 504. Control logic (software) and data are stored in the main memory 504 which may take the form of random access memory (RAM).

The system 500 also includes input devices 512, a graphics processor 506, and a display 508, e.g., a conventional CRT (cathode ray tube), LCD (liquid crystal display), LED (light emitting diode), plasma display or the like. User input may be received from the input devices 512, e.g., keyboard, mouse, touchpad, microphone, and the like. In one embodiment, the graphics processor 506 may include a plurality of shader modules, a rasterization module, etc. Each of the foregoing modules may even be situated on a single semiconductor platform to form a graphics processing unit (GPU). The graphics processor 506 may be coupled to one or more DRAM devices 515 and may be configured to refresh different regions of the DRAM(s) at different rates based on characterization information. In one embodiment, the central processor 501 is coupled to one or more DRAM devices 515 and is configured to refresh different regions of the DRAM(s) at different rates based on characterization information.

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user. One or more of the systems 500 shown in FIG. 5, may be incorporated in the system 500 to provide power to one or more of the chips.

The system 500 may also include a secondary storage 510. The secondary storage 510 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. Computer programs, or computer control logic algorithms, may be stored in the main memory 504 and/or the secondary storage 510. Such computer programs, when executed, enable the system 500 to perform various functions. The main memory 504, the storage 510, and/or any other storage are possible examples of computer-readable media.

In one embodiment, the architecture and/or functionality of the various previous figures may be implemented in the context of the central processor 501, the graphics processor 506, an integrated circuit (not shown) that is capable of at least a portion of the capabilities of both the central processor 501 and the graphics processor 506, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 500 may take the form of a desktop computer, laptop computer, server, workstation, game consoles, embedded system, and/or any other type of logic. Still yet, the system 500 may take the form of various other devices including, but not limited to a personal digital assistant (PDA) device, a mobile phone device, a television, etc.

Further, while not shown, the system 500 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   computing a first number of trailing zeros in a first significand associated with a floating-point format input operand;
   computing a second number of trailing zeros in a second significand;
   summing the first number of trailing zeros with the second number of trailing zeros to produce a trailing zero sum;
   receiving a disable control signal that is based on a characteristic of the floating-point format input operand and the trailing zero sum;
   disabling a portion of a logic circuit based on the disable control signal; and
   processing the first significand and the second significand by the logic circuit to generate an output.

2. The method of claim 1, wherein the disabling of the portion of the logic circuit comprises disabling one or more bits of a register configured to store the first significand.

3. The method of claim 1, wherein the disabling of the portion of the logic circuit comprises disabling propagation of a carry signal.

4. The method of claim 1, wherein the characteristic of the floating-point format input operand is associated with a bit accuracy specified for a computation performed by the logic circuit.

5. The method of claim 1, wherein the characteristic of the floating-point format input operand is associated with a number of bits needed to represent a constant value.

6. The method of claim 1, wherein the characteristic of the floating-point format input operand is a permitted error associated with the output.

7. The method of claim 6, wherein the permitted error corresponds to a Newton-Raphson known error bound for a floating-point computation.

8. The method of claim 1, wherein the disabling comprises decoupling a first portion of the logic circuit from a second portion of the logic circuit.

9. A processing unit, comprising:
   a logic disable unit that is configured to:
      compute a first number of trailing zeros in a first significand associated with a floating-point format input operand;
      compute a second number of trailing zeros in a second significand; and
      sum the first number of trailing zeros with the second number of trailing zeros to produce a trailing zero sum; and
   arithmetic logic circuitry configured to:
      receive a disable control signal that is based on a characteristic of the floating-point format input operand and the trailing zero sum;
      disable a portion of the arithmetic logic circuitry based on the disable control signal; and
      process the first significand and the second significand to generate an output.

10. The processing unit of claim 9, further comprising a register configured to store the first significand, wherein the disabling of the portion of the logic circuit comprises disabling one or more bits of the register.

11. The processing unit of claim 9, wherein the disabling of the portion of the arithmetic logic circuitry comprises disabling propagation of a carry signal.

12. The processing unit of claim 9, wherein the characteristic of the floating-point format input operand is associated with a bit accuracy specified for a computation performed by the arithmetic logic circuitry.

13. The processing unit of claim 9, wherein the characteristic of the floating-point format input operand is associated with a number of bits needed to represent a constant value.

14. The processing unit of claim 9, wherein the characteristic of the floating-point format input operand is a permitted error associated with the output.

15. The processing unit of claim 14, wherein the permitted error corresponds to a Newton-Raphson known error bound for a floating-point computation.

16. The processing unit of claim 9, wherein the disabling comprises decoupling a first portion of the arithmetic logic circuitry from a second portion of the arithmetic logic circuitry.

17. A system, comprising:
   a memory; and
   a processing unit, comprising:

a logic disable unit that is configured to:
- compute a first number of trailing zeros in a first significand associated with a floating-point format input operand;
- compute a second number of trailing zeros in a second significand; and
- sum the first number of trailing zeros with the second number of trailing zeros to produce a trailing zero sum; and arithmetic logic circuitry configured to:
- receive a disable control signal that is based on a characteristic of the floating-point format input operand and the trailing zero sum;
- disable a portion of the arithmetic logic circuitry based on the disable control signal; and
- process the first significand and the second significand to generate an output.

18. The system of claim 17, wherein the characteristic of the floating-point format input operand is a permitted error associated with the output.

19. The system of claim 18, wherein the permitted error corresponds to a Newton-Raphson known error bound for a floating-point computation.

20. The system of claim 17, wherein the disabling comprises decoupling a first portion of the arithmetic logic circuitry from a second portion of the arithmetic logic circuitry.

* * * * *